United States Patent [19]

Chana et al.

[11] Patent Number: 4,768,999

[45] Date of Patent: Sep. 6, 1988

[54] FAN-FOLDED BELT

[75] Inventors: Howard E. Chana; Michael B. Solt, both of Troy, Mich.

[73] Assignee: General Motors Corporation, Detroit, Mich.

[21] Appl. No.: 50,686

[22] Filed: May 18, 1987

[51] Int. Cl.$^4$ .............................................. F16G 1/22
[52] U.S. Cl. .................................................... 474/242
[58] Field of Search ................ 474/201, 242, 240, 237

[56] References Cited

U.S. PATENT DOCUMENTS 4,540,388  9/1985  Cataldo et al. ...................... 474/242
4,581,002  4/1986  Cataldo ................................ 474/242

Primary Examiner—Thuy M. Bui
Attorney, Agent, or Firm—Donald F. Scherer

[57] ABSTRACT

A fan-folded drive belt is comprised of a folded metal belt maintained in a continuous loop by a plurality of continuous metal bands maintained in tension and supported in a band slot on the folded metal belt. The folded metal belt is made from a single strip of metal which is formed by machining processes, such as stamping, and then accordion folded to produce individual drive members arranged with long and short drive leg members being adjacent. The adjacent drive members are connected at either the inner or outer extremes. The drive belt transfers drive forces between spaced pulleys or sheaves through frictional engagement therewith. During such driving, the outer portion of the belt is deflected or flexes as the belt travels around the pulleys. This causes high stress levels to be induced within the individual drive members. To reduce the stress level, the various points on the folded belt, a portion of material disposed outwardly from the continuous metal bands is removed at the fold line. This portion of the folded belt is also made transversely wider and preferably slightly longer in the outward direction.

3 Claims, 1 Drawing Sheet

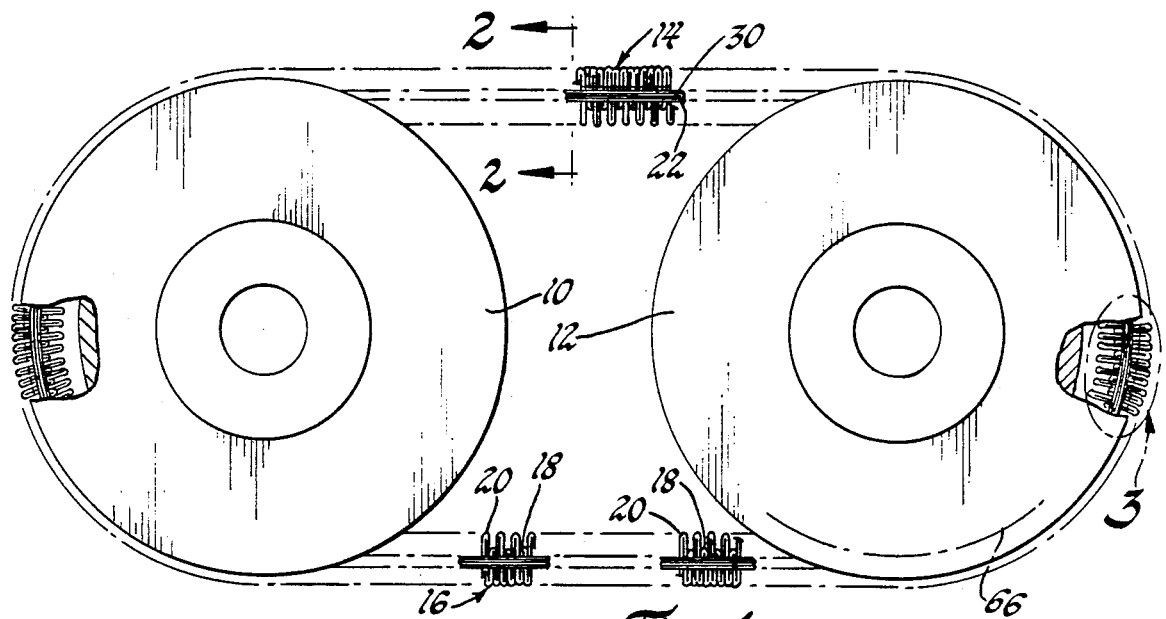
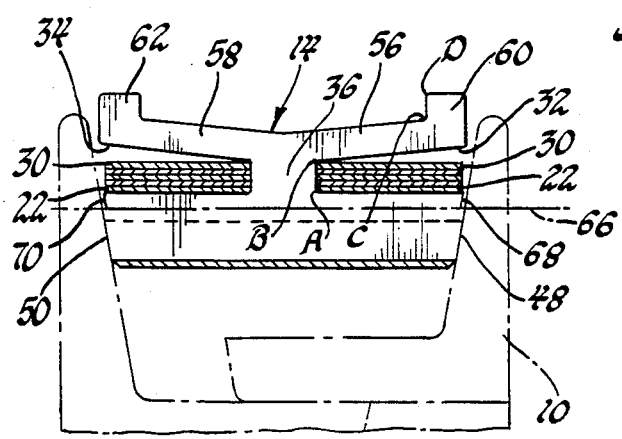
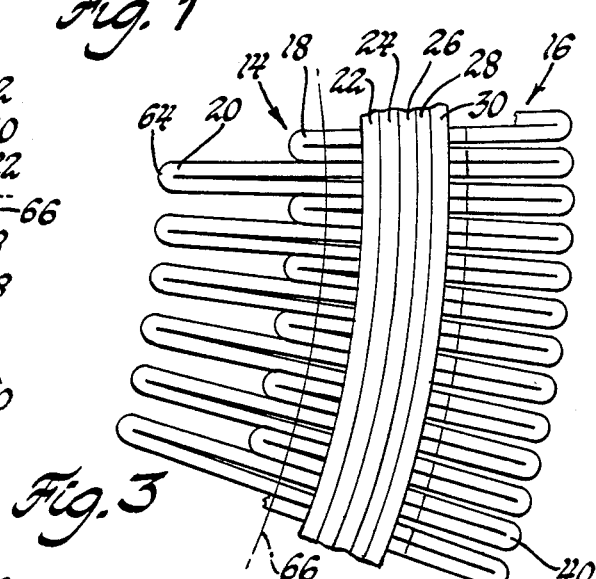
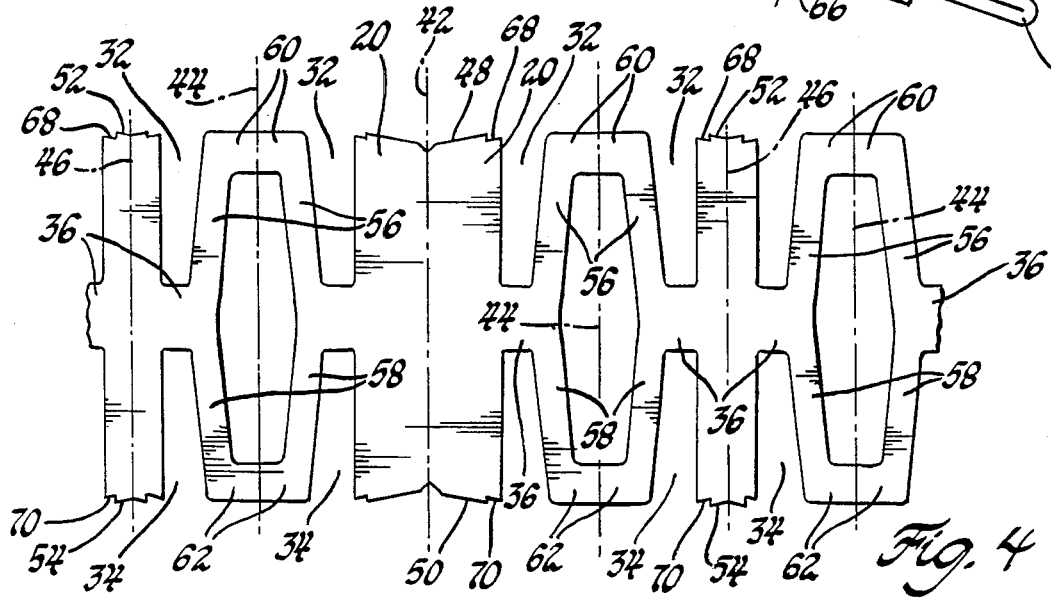

FAN-FOLDED BELT

BACKGROUND OF THE INVENTION

This invention relates to drive belts and more particularly to fan-folded drive belts.

Prior art fan-folded drive belts are shown in U.S. Pat. No. 4,581,002 issued to Cataldo on Apr. 8, 1986, and U.S. Pat. No. 4,540,388 issued to Cataldo on Sept. 10, 1985. The drawings in these patents describe the prior art shape of the stamped strip prior to folding. These belts exhibit high stress levels at the inner and outer corners of the belt slot. This stress can be detrimental to the life of the belt or could significantly limit the load capacity of the belt.

SUMMARY OF THE INVENTION

The present invention seeks to increase the life of the belt and/or increase the torque transmitting capacity of the belt. This can be accomplished by providing a more even stress distribution within the drive block members of the fan-folded belt by changing the shape of the drive members. This change in shape also reduces the maximum stress by 40 to 60 percent when compared with a similar size prior art belt. This results in a change in the transverse cross-sectional shape of the folded belt. The changed cross-sectional softens the spring rate of the folded members in the longitudinal direction. The final shape can be stamped into a strip prior to folding or; the strip can be folded and then machined.

The present invention provides for the removal of material from the outer fold line or joining surface of that portion of the folded belt member that is disposed above the band slot. For optimum stress value, the present invention provides for a slight increase in the height and width of the outer portion of each folded member.

In the preferred embodiment, the outer fold line or surface is limited in length to less than 30 percent of the total transverse length of the adjacent members at the fold line. The joining material is disposed at the outer extremes of the fold line leaving the center portion of the adjacent drive blocks unconnected. This structure softens the spring rate and distributes these stresses more evenly and also provides for lower stress levels.

The preferred embodiment provides a cutout or undercut portion on the taper face of the drive block between the pitch diameter and the band slot. This reduces the scrubbing between the face of the pulley and the taper of the drive block to thereby improve the overall efficiency of the drive system.

It is therefore an object of this invention to provide an improved fan-folded drive belt having reduced stress levels in the fan-folded portion of the drive belt as it negotiates the pulley in the belt drive system.

It is another object of this invention to provide an improved fan-folded drive belt for a pulley drive system wherein the folded portion of the belt outward of the band slot is continuous for less than 30 percent of the total fold length and is distributed equally at the distal outer edges when viewed in the transverse direction.

It is a further object of this invention to provide an improved fan-folded drive belt for a pulley drive system wherein the fan-folded drive belt has a fan-folded metal portion maintained in a continuous loop by continuous metal bands maintained under tension in band slots formed in the fan-folded metal portion, and wherein a portion of the fan-folded metal disposed outward of the band slot has laterally extending arms and upstanding arms, and also wherein the upstanding arms are contiguous with the corresponding elements of the adjacent portion of the fan-folded belt.

These and other objects and advantages of the present invention will be more apparent from the following specification and drawings.

DESCRIPTION OF THE DRAWINGS

FIG. 1 is an elevational view of a pulley and belt drive system utilizing a belt constructed in accordance with the present invention.

FIG. 2 is a view taken along line 2—2 of FIG. 1.

FIG. 3 is an enlarged portion of the belt shown at 3 in FIG. 1.

FIG. 4 is a view of the fan-folded belt in the unfolded condition.

DESCRIPTION OF THE PREFERRED EMBODIMENT

Referring to the drawings, wherein like figures represent the same or corresponding parts throughout the several views, there is seen in FIG. 1 a pair of drive pulleys 10 and 12 which are interconnected by a drive belt generally designated 14. The pulleys 10 and 12 can be either of the fixed or variable V-groove type.

The construction of both of these types of pulleys is well-known, such that a further discussion of their structure is not necessary at this point since it is not relative to the understanding of the present invention.

FIG. 2 shows the drive belt 14 entering one of the drive pulleys, such as 10, which is shown in phantom line.

As can be seen from FIGS. 1 and 3, the belt 14 is comprised of a fan-folded portion, generally designated 16, having short legs 18 and long legs 20. The fan-folded portion 16 is maintained in a continuous loop by a plurality of continuous metal bands designated 22 through 30. A set of these metal bands 22 through 30 reside in each band slot 32 and 34, which are formed in the fan-folded portion 16. As seen in FIG. 2, these band slots 32 and 34 are disposed on either side of the center bar 36.

As described in the Cataldo prior art referred to above, the continuous metal bands are loaded in tension to maintain the ends of the fan-folded portion 16 in abutment. This prevents separation while the abutting ends are traversing the span between pulleys 10 and 12.

In FIG. 3, it can be seen that the outermost ends of the fan-folded portion 16, which are designated 38 and 40, deflect such that separation between these adjacent ends occurs when the belt is negotiating the pulleys.

FIG. 4 is a view which depicts the folded portion 16 in the unfolded condition. This is as it would appear upon leaving a stamping machine or after being folded and formed by machining processes. In either event, the folded belt is formed from a continuous metal strip. The unfolded portion has a plurality of fold lines 42, 44 and 46. Fold lines 44 are outer fold lines while the fold lines 42 and 46 are inner fold lines. The portions of the belt between fold lines 44, centered on fold line 42, are mirror images about the fold line 42. The portions of the belt between adjacent fold lines 44, centered on the intermediate fold line 46, are mirror images about the fold line 46. The portion of material between outer fold lines 44 and centered on fold line 42, describes one of the long legs 20 while the material between adjacent fold lines 44 and centered on fold line 46, describes a short leg 18. Each short leg 18 is joined to an adjacent long leg 20 at the outer fold line 44 and vice versa. This fold line, as described above, occurs at the outer extremes of the folded portion 16, previously designated as 38 and 40.

Each long leg 20 has drive faces 48 and 50 which frictionally engage the surfaces of the pulleys 10 and 12. Each short leg 18 has drive faces 52 and 54 which also engage the drive pulleys 10 and 12. The drive faces 48, 50 and 52, 54 are the tapered edges of a trapezoidal portion on each drive block. The total drive block is comprised of the trapezoidal portion, the center bar 36, a pair of transverse arms 56 and 58 and a pair of upstanding arms 60 and 62. The upstanding arms are substantially perpendicular to the general transverse axis of the belt. In the preferred embodiment, the arms 56 and 58 angle upward at approximately 7 degrees in the transverse direction.

Both the long leg portions 20 and the short leg portions 18 have identical structures between the trapezoidal blocks and the outer fold line 44. This can best be seen by comparing FIGS. 4 and 2.

The band slots 32 and 34 are formed between the trapezoidal blocks and the transversely disposed arms 56 and 58. It is evident from FIG. 4, that adjacent members are connected only at the outer extremes of the transverse arms 56 and 58 through the upstanding arm portions 60 and 62 and at the inner extremes. Material may also be removed at the inner fold lines; if desired, however, the benefit from such removal is of less import.

When the fan-folded portion is negotiating a pulley, as seen in FIG. 3, the portion of the belt between the lower ends 64 of long legs 20 and a pitch diameter or line 66 are captured between the sheaves of the pulleys and are maintained at a fixed attitude. Since the outer portion of the belt has to negotiate a longer path of travel around the pulley, flexing of the belt occurs between the pitch diameter 66 and the outer extremes 40 and 38.

This flexing induces stress levels at points A, B, C and D. The stress levels at A and B are very significant and very high in prior art belts where the adjacent band members are continuous along the upper fold line. For example, prior art belts can have stresses, determined by finite element analysis, at A ranging from 108K psi to 88K psi, depending upon the load being transmitted. Under the same load conditions, the stress levels at B range from 47K psi to 45K psi. Obviously, these stress levels are significant when the fatigue life of the belt is considered.

With the present invention, the stresses, determined by finite element analysis, at points A, B, C and D are 48K, 28K, 28K and 38K psi, respectively, at maximum load, and 21K, 28K, 28K and 38K psi at light load. Therefore, the belt constructed in accordance with the present invention would have a significantly longer fatigue life or operating life than a prior art belt. For example, if a conventional steel in a hot rolled condition is utilized, the maximum allowable stress for infinite life is 56K psi. Quite obviously, the prior art belt would not have infinite life utilizing this type of steel.

If a ground and polished surface is utilized on the belt material, the maximum allowable stress is 143K psi. In theory, the prior art belt would have an infinite life with this material. To provide a material which would satisfy the stress levels of the prior art belts, a ground surface finish would have to be utilized to have a maximum life stress of 129K psi. The use of a ground or ground and polished finish on the belt material increases the cost considerably. Thus, the present invention will not only provide a belt with longer life, it will also reduce the manufacturing expenses considerably.

The drive surfaces 48 and 50 adjacent legs 52 and 54 adjacent the respective band slots 32 and 34 have cutouts 68 and 70, respectively. These cutouts 68 and 70 are outboard of the pitch diameter 66. The cutouts are provided to permit the belt to flex without scrubbing on the faces of the pulleys 10 and 12. This improves the efficiency of the drive system thereby reducing the operating costs of a machine utilizing a drive belt construction in accordance with the present invention.

By providing a noncontinuous fold line at the outer folded surfaces, the spring rate of the drive belt in a longitudinal direction is greatly reduced. It is the softening of the spring rate which provides a considerable amount of decrease in the stress level found in the belt. By providing the structure shown, not only are the stress levels decreased but they are more equally distributed throughout the material of each drive block.

The structure outwardly of the band slots, that is, the transverse arms 56 and 58 and upstanding portions 60 and 62 are significantly different from the prior art in that the transverse arms are wider and the upstanding portions are disposed preferably slightly more outward than the extremes which are found in the prior art. In the prior art, the upper portion of the belt would be T-shaped and the outer fold line would be continuous. Such construction can be seen in the Cataldo patents previously mentioned and repeated here for convenience, namely, U.S. Pat. Nos. 4,581,002 and 4,500,388.

It is believed that a person comparing the structures of the prior art, as described in these patents, and the present invention, will become aware of the improvements that can be made in stress distribution and stress levels by the expedient of a noncontinuous upper fold line. Also, those skilled in the art will appreciate that the widening of the transverse arms 56 and 58 also contributes to the softening of the longitudinal spring rate of the folded belt member.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in skip folded push-type drive belts for variable speed pulley drives with each pulley having spaced adjustable sheaves to change the drive ratio between the pulleys from a maximum underdrive to a maximum overdrive with each pulley having a pitch diameter determined by the drive ratio, said belt being comprised of a band of fan-folded alternate long members and short members maintained in a continuous loop by continuous metal belts disposed in belt slots formed on the long and short members, each of said members frictionally engaging said sheaves at the pitch diameter with the portion of the members radially inward of the pitch diameter being squeezed between the pulley sheaves and a belt retention portion radially outward of the belt slots being free to deflect as the band is wrapped on and unwrapped from each pulley during drive transmissions; wherein the improvement comprises each said belt retention portion of said long and short members extending radially outward of said pitch diameter including an upstanding leg having a pair of edge portions defining the end walls for the belt slots, a pair of generally transverse arm portions extending from each said end wall and each having a distal end and an integral joining portion extending radially outward from each arm portion at the distal end thereof and each said joining portion being integral with the adjacent member in a longitudinal direction to form a fold connection therebetween and being disconnected from the transversely adjacent joining portion, each said end wall having inner and outer stress points and each joining portion having inner and outer stress points, said arm members being sufficiently long to cause the stress at the outer end wall and inner joining portion stress points resulting from deflection of said belt retention portion to be substantially equal.

2. An improvement in skip folded push-type drive belts for variable speed pulley drives with each pulley having spaced adjustable sheaves to change the drive ratio between the pulleys from a maximum underdrive to a maximum overdrive with each pulley having a pitch diameter determined by the drive ratio, said belt being comprised of a band of fan-folded alternate long members and short members maintained in a continuous loop by continuous metal belts disposed in belt slots formed on the long and short members, each of said members frictionally engaging said sheaves at the pitch diameter with the portion of the members radially inward of the pitch diameter being squeezed between the pulley sheaves and a belt retention portion radially outward of the belt slots being free to deflect as the band is wrapped on and unwrapped from each pulley during drive transmissions; wherein the improvement comprises each said belt retention portion of said long and short members extending radially outward of said pitch diameter including an upstanding leg having a pair of edge portions defining the end walls for the belt slots, a generally transverse arm portion extending from each said end wall and having a distal end, an integral joining portion extending substantially perpendicular to said transverse arm portion and outward from said belt slot at the distal end thereof and being integral with the adjacent member to form a fold connection therebetween and a central open portion between said integral joining portions, each said end wall having inner and outer stress points and each joining portion having inner and outer stress points, said arm members being sufficiently long to cause the stress at the outer end wall and inner joining portion stress points resulting from deflection of said belt retention portion to be substantially equal.

3. An improvement in skip folded push-type drive belts for variable speed pulley drives with each pulley having spaced adjustable sheaves to change the drive ratio between the pulleys from a maximum underdrive to a maximum overdrive with each pulley having a pitch diameter determined by the drive ratio, said belt being comprised of a band of fan-folded alternate long members and short members maintained in a continuous loop by continuous metal belts disposed in belt slots formed on the long and short members, each of said members frictionally engaging said sheaves at the pitch diameter with the portion of the members radially inward of the pitch diameter being squeezed between the pulley sheaves and a belt retention portion radially outward of the belt slots being free to deflect as the band is wrapped on and unwrapped from each pulley during drive transmission; wherein the improvement comprises each said belt retention portion of said long and short members extending radially outward of said pitch diameter including an upstanding leg having a pair of edge portions defining the end walls for the belt slots, a generally transverse arm portion extending from each said end wall and having a distal end and an integral joining portion extending substantially perpendicular to said transverse arm portion and outward from said belt slot at the distal end thereof and being integral with the adjacent member to form a fold connection therebetween, each said end wall having inner and outer stress points and each joining portion having inner and outer stress points, said joining portion being less than 30 percent of the total transverse length of both said transverse arm and said joining portion, said arm members being sufficiently long to cause the stress at the outer end wall and inner joining portion stress points resulting from deflection of said belt retention portion to be substantially equal.

* * * * *